United States Patent
Clark et al.

(10) Patent No.: US 10,614,434 B2
(45) Date of Patent: Apr. 7, 2020

(54) VEHICLE SERVICE KIOSK SYSTEM

(71) Applicant: Walmart Apollo, LLC

(72) Inventors: Jimmie R. Clark, Fayetteville, AR (US); Michael Lawerance Payne, Centerton, AR (US); Jeffrey L. Stone, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 119 days.

(21) Appl. No.: 15/659,726

(22) Filed: Jul. 26, 2017

(65) Prior Publication Data

US 2018/0039963 A1    Feb. 8, 2018

Related U.S. Application Data

(60) Provisional application No. 62/369,865, filed on Aug. 2, 2016.

(51) Int. Cl.
| | | |
|---|---|---|
| *G06Q 20/18* | (2012.01) | |
| *G07F 7/10* | (2006.01) | |
| *G07F 17/00* | (2006.01) | |
| *G06K 7/14* | (2006.01) | |

(52) U.S. Cl.
CPC ............ *G06Q 20/18* (2013.01); *G06K 7/1413* (2013.01); *G07F 7/10* (2013.01); *G07F 17/0014* (2013.01); *G07F 17/0042* (2013.01)

(58) Field of Classification Search
USPC .......................................................... 705/16
See application file for complete search history.

(56) References Cited

U.S. PATENT DOCUMENTS

| | | |
|---|---|---|
| 4,990,757 A | 2/1991 | Edwards et al. |
| 7,347,361 B2 | 3/2008 | Lovett |
| 7,533,809 B1 | 5/2009 | Robinson et al. |
| 7,543,741 B2 | 6/2009 | Lovett |
| 7,810,720 B2 | 10/2010 | Lovett |
| 7,885,893 B2 | 2/2011 | Alexander |
| 8,799,037 B2 | 8/2014 | Stefik et al. |
| 2006/0155439 A1 | 7/2006 | Slawinski et al. |
| 2008/0228346 A1* | 9/2008 | Lucas ............... G06Q 10/087 701/31.4 |
| 2011/0313937 A1* | 12/2011 | Moore, Jr. ......... G06Q 30/0645 705/307 |
| 2012/0130872 A1 | 5/2012 | Baughman et al. |
| 2012/0194354 A1 | 8/2012 | Kundmueller et al. |
| 2013/0246132 A1 | 9/2013 | Buie |
| 2014/0067492 A1* | 3/2014 | Turner ............... G06Q 20/145 705/13 |
| 2014/0266004 A1 | 9/2014 | Andrews, Jr. |

OTHER PUBLICATIONS

"3M Automated Payment Stations," Solutions.3m.com, accessed Oct. 22, 2015; 3 pages.

(Continued)

*Primary Examiner* — Garcia Ade
(74) *Attorney, Agent, or Firm* — Schmeiser, Olsen & Watts LLP; Timothy P. Collins

(57) ABSTRACT

A kiosk comprises a display for displaying information related to a payment of a vehicle service; a special purpose processor that processes the payment of the vehicle service; and a dispenser for providing a key of the vehicle after the payment is processed.

9 Claims, 5 Drawing Sheets

(56) References Cited

OTHER PUBLICATIONS

"Motor Pools," Michigan.gov, Michigan Department of Technology, Management, and Budget, accessed on Oct. 22, 2015; 3 pages.
International Preliminary Report on Patentability in PCT/US2017/043832 dated Feb. 14, 2019; 7 pages.
International Search Report and Written Opinion in International Patent Application No. PCT/US17/43832, dated Oct. 5, 2017; 8 pages.
Office Action in Canadian Patent Application No. 3,030,302 dated Dec. 12, 2019; 4 pages.

* cited by examiner

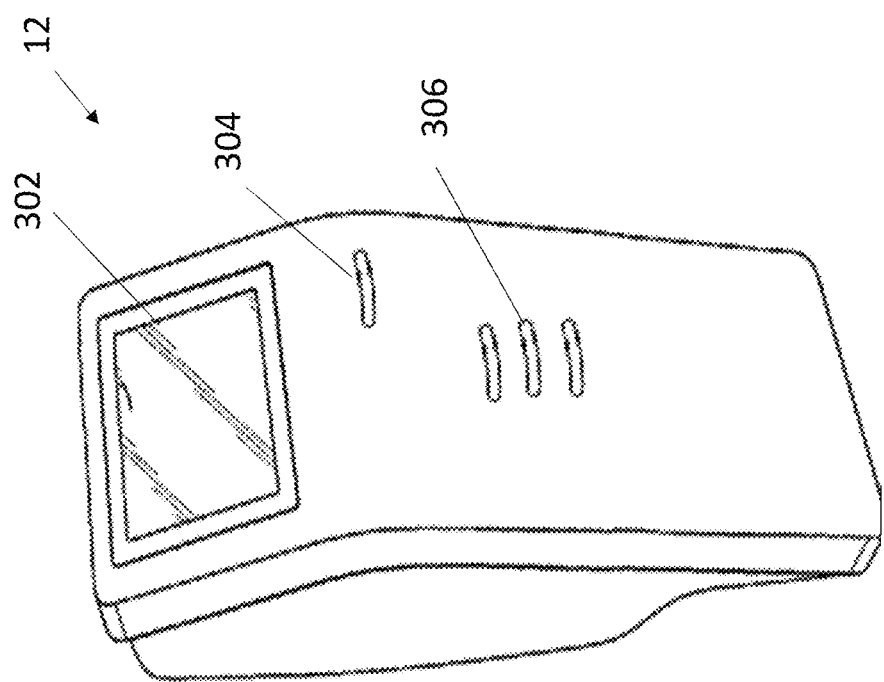

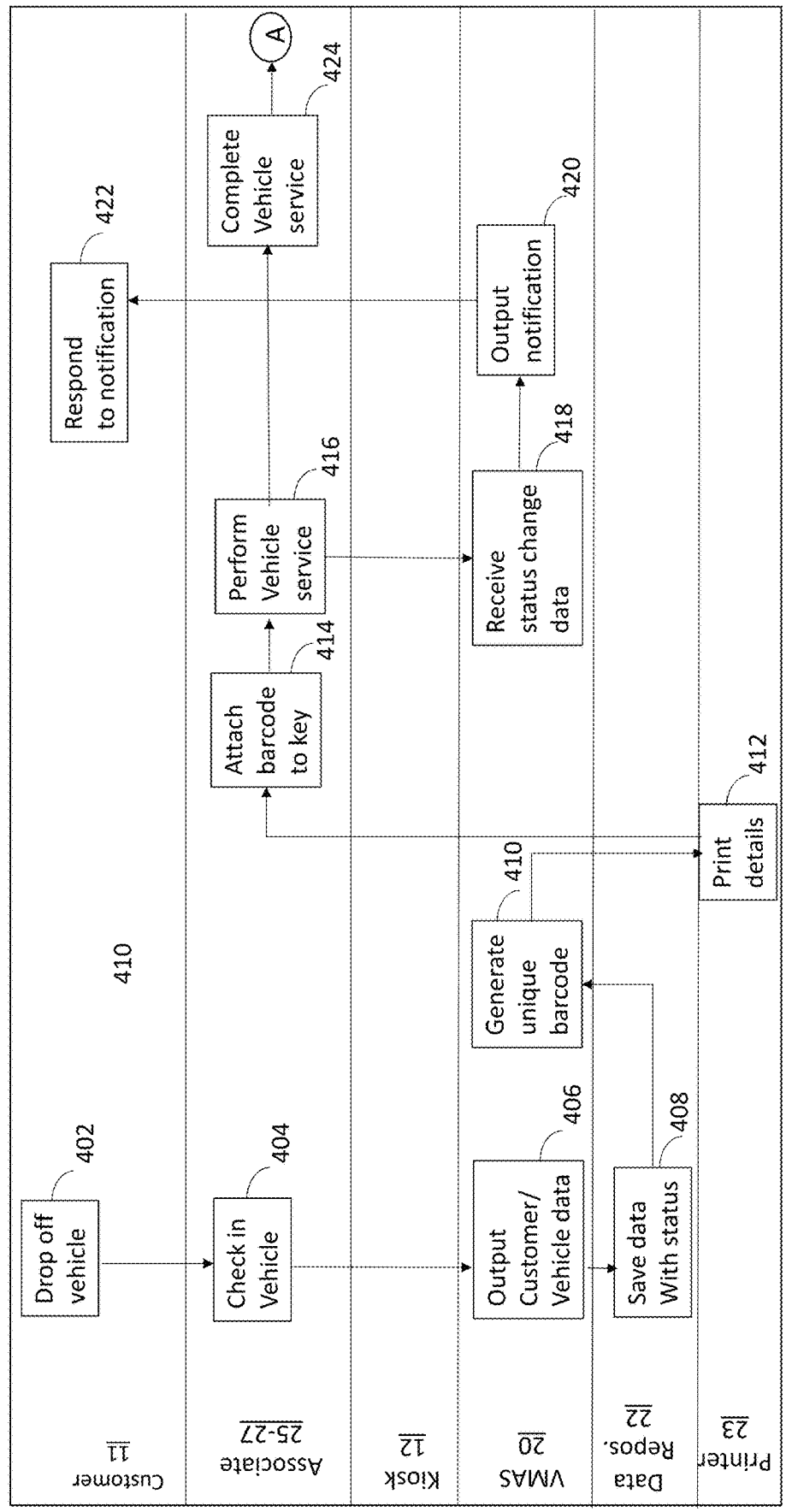

VEHICLE SERVICE KIOSK SYSTEM

RELATED APPLICATIONS

This application claims the benefit of U.S. Provisional Patent No. 62/369,865, filed Aug. 2, 2016, entitled "Vehicle Service Kiosk System," the contents of which are incorporated by reference herein in their entirety.

FIELD

The present concepts relate generally to approaches for payment of performed services, and more specifically, to systems and methods for payment of services performed at a vehicle service center.

BACKGROUND

Customers at a vehicle service center, for example, an oil change express or tire changing service center, often face long lines of other customers waiting to pay for services performed and to retrieve their vehicles.

BRIEF SUMMARY

In one aspect, a kiosk comprises a display for displaying information related to a payment of a vehicle service; a special purpose processor that processes the payment of the vehicle service; and a dispenser for providing a key of the vehicle after the payment is processed.

In some embodiments, the vehicle service is associated with a customer account so that vehicle service information is exchanged via the customer account.

In some embodiments, the customer account includes contact information, and wherein the vehicle service information is exchanged according to the contact information. In some embodiments, the vehicle service information includes a status provided by a mechanic performing the vehicle service. In some embodiments, the status is presented in the form of a digital photograph.

In some embodiments, the special processor receives data from a mobile electronic device indicating that the vehicle service is completed, and wherein the status is generated in response to the received data.

In some embodiments, the dispenser includes a plurality of repositories, each constructed and arranged to temporarily store a corresponding plurality of keys.

In some embodiments, the special purpose processor distinguishes the key from the other keys of the plurality of keys by barcode data retrieved from a barcode corresponding to the key.

In some embodiments, the kiosk further comprises a biometric processor for associating an authorized receiver of the key and a barcode corresponding to the key.

In another aspect, a system for processing a payment of a vehicle service comprises a data repository that stores vehicle service information related to a vehicle for receiving the vehicle service, customer account information a person associated with the vehicle, payment information regarding the payment of the vehicle service, or a combination thereof; a payment kiosk that displays information related to the payment of the vehicle service, processes the payment of the vehicle service, and dispenses a key of the vehicle after the payment is processed; and a maintenance application processor that facilitates a communication between a mobile device of the person associated with the vehicle, a mobile device of a representative of the facility performing the vehicle service, the data repository, and the payment kiosk.

In some embodiments, the maintenance application processor provides status information regarding the vehicle service to the mobile device of the person associated with the vehicle.

In some embodiments, the payment kiosk comprises: a display for displaying the information related to the payment of the vehicle service; a special purpose processor that processes the payment of the vehicle service; and a dispenser for providing the key of the vehicle.

In some embodiments, the special processor receives data from a mobile electronic device indicating that the vehicle service is completed, and wherein the status is generated in response to the received data.

In some embodiments, the payment kiosk includes a plurality of repositories, each constructed and arranged to temporarily store a corresponding plurality of keys.

In some embodiments, the payment kiosk distinguishes the key from the other keys of the plurality of keys by barcode data retrieved from a barcode corresponding to the key.

In another aspect, a method for payment at a vehicle service establishment comprises generating an association between a key of a vehicle receiving a vehicle service and customer information related to a person associated with the vehicle; providing status changes regarding the vehicle service; storing, by a kiosk, the key after the vehicle service is completed; processing, by the kiosk, a payment of the vehicle service; and dispensing, by the kiosk, the key of the vehicle after the payment is processed.

In some embodiments, the method further comprises associating an authorized receiver of the key and a barcode corresponding to the key.

In some embodiments, the method further comprises distinguishing the key from other keys of the plurality of keys by barcode data retrieved from a barcode processed at the kiosk corresponding to the key.

In some embodiments, the method further comprises associating the vehicle service with a customer account so that vehicle service information is exchanged via the customer account.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 3 is an oblique view of a payment kiosk, in accordance with some embodiments.

FIG. 4A and FIG. 4B are a flow diagrams illustrating a vehicle service operation from a time when a customer arrives at a service center to a time of payment for a performed service, in accordance with some embodiments.

DETAILED DESCRIPTION

In the following description, specific details are set forth although it should be appreciated by one of ordinary skill in the art that the systems and methods can be practiced without at least some of the details. In some instances, known features or processes are not described in detail so as to not obscure the present invention.

Figure 1:
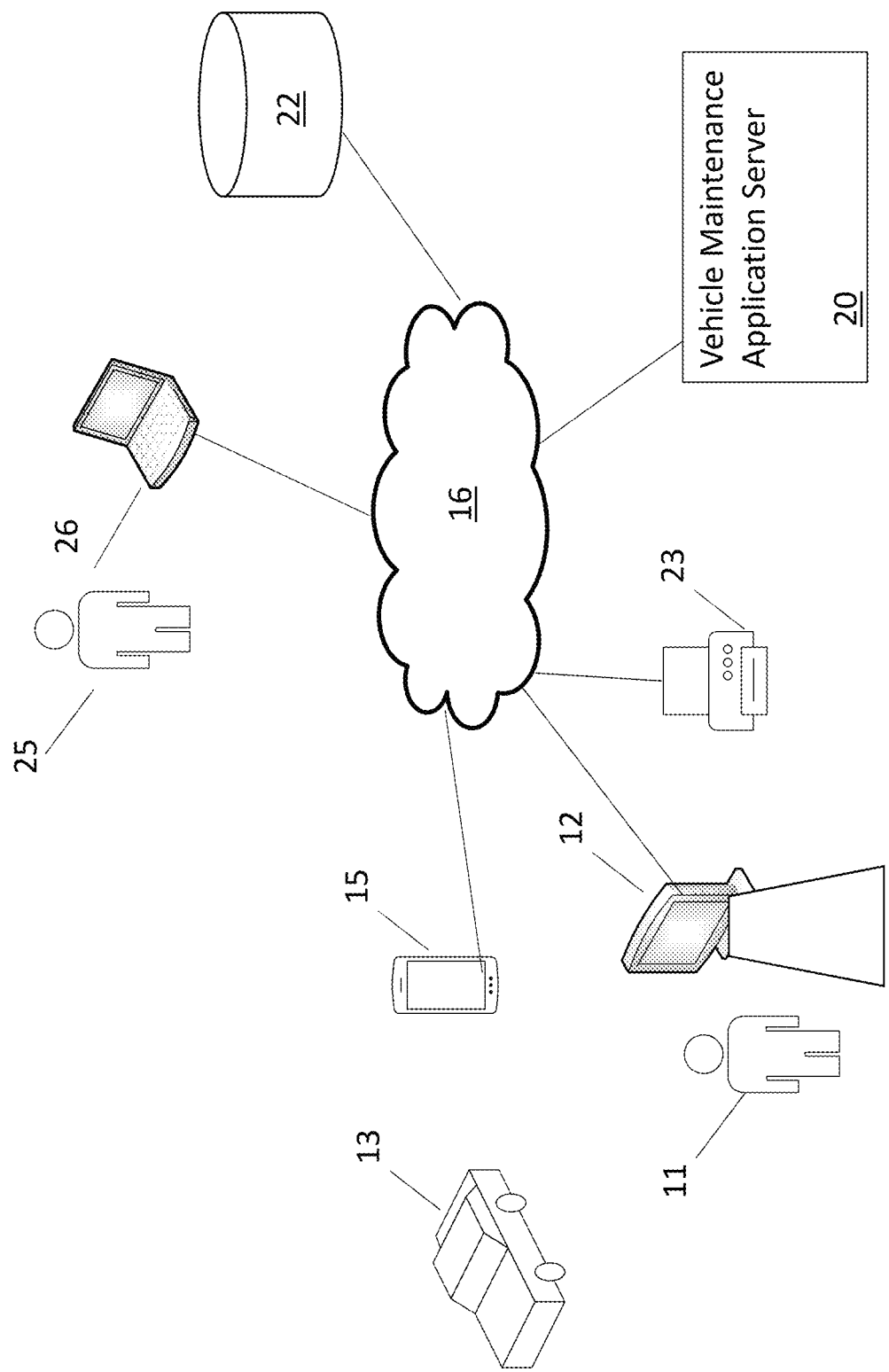
FIG. 1 depicts an example system that can be used in implementations of embodiments of the present inventive concepts.

FIG. 1 depicts an example system that can be used in implementations of embodiments of the present inventive concepts.

The system may include one or more of a kiosk 12, a customer mobile computing device 15, a vehicle maintenance application server 20, a data repository 22, and a store computer 26, which may communicate with each other and other electronic devices via a communications network 16. The network 16 may be a public switched telephone network (PSTN), a mobile communications network, a data network, such as a local area network (LAN) or wide area network (WAN), or a combination thereof, or other communication network known to those of ordinary skill in the art. The kiosk 12, vehicle maintenance application server 20, and data repository 22 may be part of a same common platform, for example, a single housing, or separate as shown in FIG. 1.

The kiosk 12 permits a customer 11 to both pay for a vehicle service and to dispense the customer's vehicle key after a service performed on the customer's vehicle 13. The kiosk 12 may communicate with a printer 23 so that a physical receipt, service summary, or related service information may be printed. Other features performed by the kiosk 12 may include customer authorization, and may include biometric devices for registering and comparing fingerprints, eye scan results, voice recognition, and so on. The kiosk 12 may include a scanning device, such as a barcode or QR code scanner for matching a vehicle with its owner or authorized user.

The customer's mobile computing device 15 receives information on a status of a service being performed on the vehicle, for example, an oil change, tire rotation, and so on. The mobile computing device 15 may also receive status alerts from the vehicle maintenance application server 20, perform a checkout function, for example, instead of or in communication with the kiosk 12, or communicate with a store computer, for example, for generating text messaging, email messaging, and so on related to a store activity with a sales associate, mechanic, or other service center representative.

An employee, associate, or other agent of the service provider may use the store computer 26, e.g., which may be a smartphone, electronic notebook, tablet, desktop computer, and so on, to communicate with the kiosk 12, for example, to indicate when a vehicle service is completed. The store computer 26 may store and execute a vehicle maintenance application 27 that communicates with the vehicle maintenance application server 20, kiosk 12, and/or data repository 22.

The store computer 26 may also provide status information, such as a digital photograph taken of the vehicle undergoing repair or other service. The vehicle maintenance application 27 may provide status information regarding the vehicle service to the customer's mobile device 15. Status information may include simple process statuses such as "waiting for service", "service in process", "waiting for customer response", "ready for pickup," and so on. A simple process status, for example, "waiting for customer response," may be accompanied by photos of various car parts needing repair or replacement such as wiper blades, air filter, tires, coolant, washer fluid, etc. The customer may be allowed to respond to the request for guidance using the customer's mobile computing device 15.

The vehicle maintenance application server 20 includes a special purpose processor that processes payment data received from the kiosk 12, and instructs the kiosk 12 to dispense via the dispenser the customer's vehicle key, for example, an ignition key, in response to authorization and approval of the payment. The vehicle maintenance application server 20 may receive data from the store computer 26 indicating that a vehicle service is complete. Other features of the server 20 include registering a location of a vehicle key. A vehicle key is physically stored within the kiosk 12. The kiosk's control application manages storage locations, such as bin number, or row/column/shelf, manages the tracking of the storage location of the customer's key or keys, and provides this information to the vehicle maintenance application server 20 which stores it in the data repository 22. The control application may also receive and process barcode and/or biometric authentication (e.g., fingerprints and the like) data from the kiosk 12.

The vehicle maintenance application server 20 may also monitor status changes regarding a vehicle service. For example, a mechanic may from a mobile device 26 input a status change where a vehicle is to transition from an oil change to a lube job. This status change information may be stored at the server 20 and output to the customer's mobile device 15.

Figure 2:
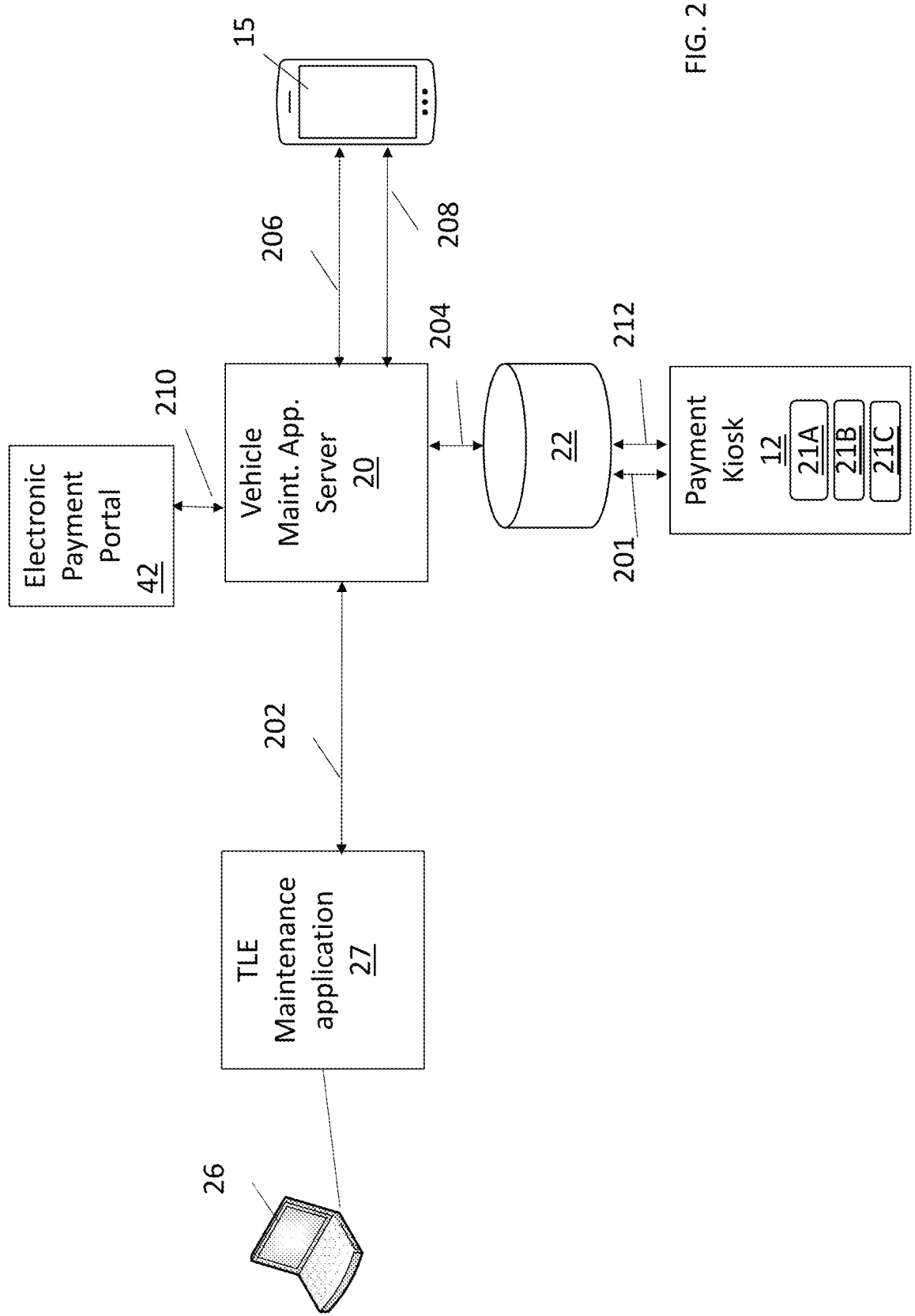
FIG. 2 depicts an example environment including system components involved with a vehicle service payment transaction, in accordance with some embodiments.

As shown in FIG. 2, during an operation, a person 11 in possession of a vehicle 13, e.g., a vehicle owner, may initiate a request (201) for a vehicle service to be performed. In doing so, the user may complete a questionnaire, provide payment information, and so on. The vehicle owner may undergo an authorization in order to match the user 11 and the vehicle 1 to prevent theft or fraud. Here, the kiosk 12 may include biometric devices for registering fingerprints, eye scan results, voice recognition, and so on. The kiosk 12 may include a scanning device, such as a barcode or QR code scanner for matching a vehicle with its customer. Authorization data may be output from the kiosk 12 to the vehicle maintenance application server 20 or other security device, where a record is created that matches the vehicle 15 with the user 11. Other kiosk-generated data such as biometric data, payment data, and the like may also be stored at a data repository in the environment of FIG. 1 or in communication with elements of the environment of FIG. 1. Attributes such as key location, i.e., bin in kiosk in which key is temporarily held until retrieved by an authorized user, along with service details, are also collected at the kiosk 12 and output to the server 20 for storage at the data repository 22.

The store computer 26 sends (202) vehicle data such as service details and status changes to the vehicle maintenance application server 20, which in turn stores (204) the vehicle data at the data repository 22. The data repository 22 may also store customer data, such as contact information, credit card information, purchase history, and so on.

The vehicle maintenance application server 20 can output (206) status alerts to the customer's mobile electronic device 15.

In some embodiments as shown in FIG. 2, the customer's mobile electronic device 15 performs a checkout process, including payment of the performed service. In other embodiments, the kiosk 12 performs a checkout process.

After payment is made via the mobile electronic device 15 or the kiosk 12, the vehicle maintenance application server 20 is updated to include the payment details of the customer, for example, by updating a customer record stored at the data repository 22. The vehicle maintenance application server 20 sends an authorization request (210) to a global electronic payment portal (such as an ePay™ service).

The kiosk 12 can check (212) for a completed transaction before dispensing the vehicle key at one of several possible key returns 21A-21C (generally, 21), also referred to as chambers or slots. The completed transaction includes a completion of agreed-upon vehicle service and authorization of payment for the service. In confirming a completed transaction, the kiosk 12, may store data entered by a user into the kiosk 12, for example, data entered in the TLE maintenance application 27. The kiosk application may retrieve service information from the data repository 22 via the vehicle maintenance application server 20, which may output customer notifications, if enabled.

Referring to FIG. 3, one embodiment of a kiosk 12 may include a computer, a display 302, a card reader 304 for processing a credit card, received cash, or other payment, and a key return chamber or slot 306 for receiving deposited vehicle keys either by an associate after the service is performed, or by the customer 11 at the time of registering the vehicle for the service. The kiosk 12 may have multiple slots 306, each for dispensing a different key. The kiosk 12 may have a single slot 306 with multiple inputs, a key at each input, and a switch that dispenses one key at a time to the slot 306 according to a predetermined order. The vehicle maintenance application server 20 may send instructions to the switch for selecting which key is output at a time, for example, based on the status of a vehicle service, customer payment, and so on. The kiosk 12 may include other components such as a keyboard, printer, mouse, optical scanners or readers, camera, and so on. Alternatively, the display 302 may be constructed and arranged to receive inputs directly from a customer, e.g., the screen may be a "touch screen" that functions as a visual display, a keyboard, and a mouse. The display 302 displays information a customer 11 who wishes to retrieve a vehicle 13 undergoing a service.

As previously described, the kiosk 12 may communicate with other devices via a network 16. A customer 11 may utilize the computer of the kiosk 12 for identification and/or authorization purposes. This may include the use of biometric devices of, at, or near the kiosk 12 for registering fingerprints, eye scan results, voice recognition, and so on. Other identification and/or authorization purposes may include the use of the display 302 and I/O devices for entering login information, such as a username and password. The kiosk 12 can also associate the customer 12 with the vehicle 13 for security reasons, for example, by registering user authentication information such as a fingerprint with a unique barcode or the like that associates the vehicle 13 and/or other information related to the vehicle such as historical data, current status, and so on, with the customer 11. The kiosk 12 may also be configured to dispense the vehicle keys at the slot 306 after confirming that the customer 12 is indeed authorized to receive the keys, e.g., by the abovementioned association established at the time of vehicle dropoff. Other authentication-based techniques may be performed by the kiosk 12, but not limited thereto, such as a camera of the kiosk 12 photographing the customer 12, vehicle 13, and/or keys, scanning a barcode using an optical reader or the like, and so on. A unique identification may be generated by the maintenance application 27 for the customer's visit to the location where the service is to be performed. The unique identification may be used as a key, e.g., a record locator, when the customer's information is stored in the database 22. The barcode that is generated represents the unique identification that is generated.

Figure 4B:
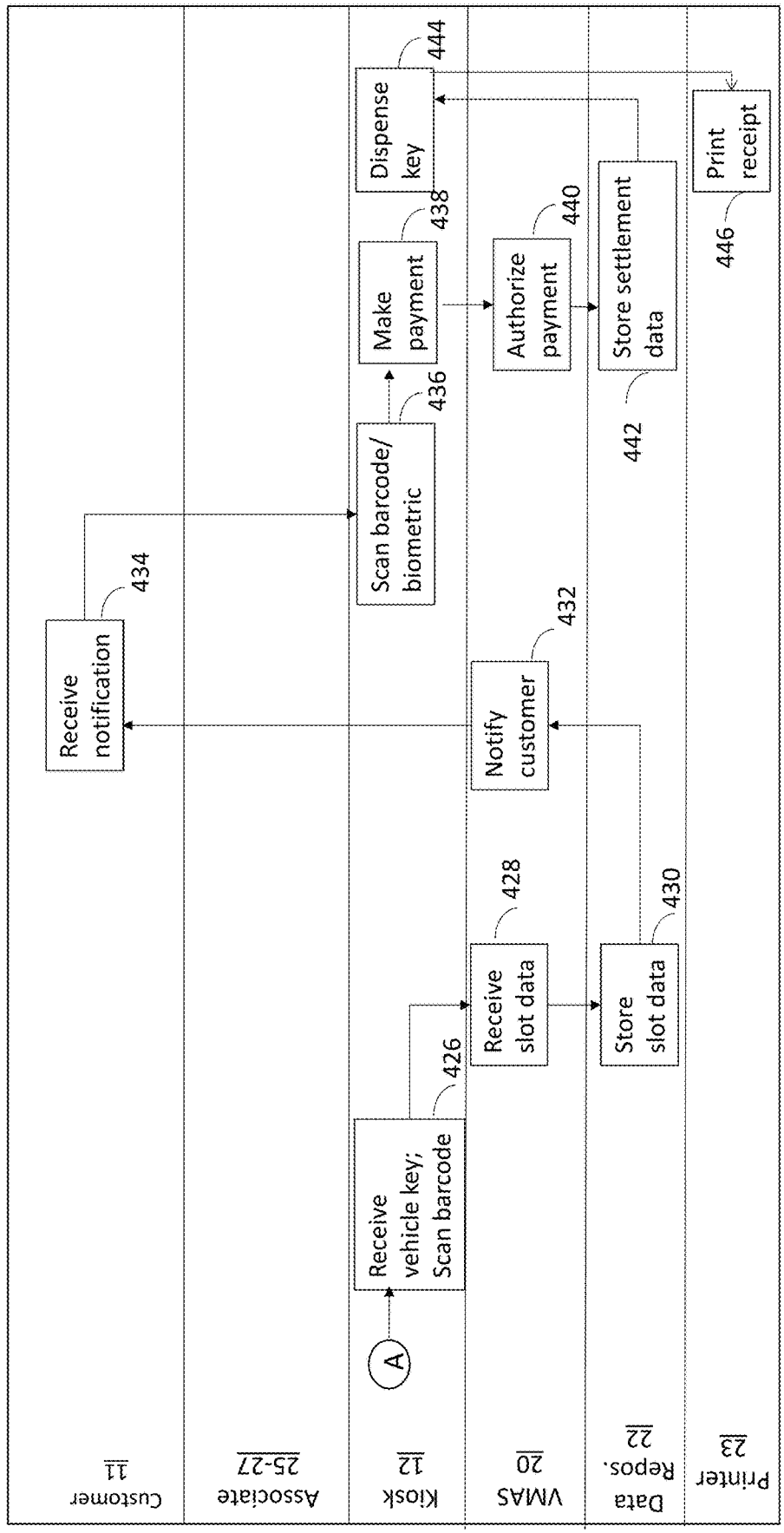

FIG. 4 is a flow diagram illustrating a vehicle service operation from a time when a customer arrives at a service center to a time of payment for a performed service, in accordance with some embodiments.

At block 402, the customer 11 provides the vehicle to the vehicle service center.

At block 404, a service center attendant 25, such as a clerk, technician, mechanic, or other person, may use a store computer 26 to register the vehicle for a particular service, repair, or the like. In doing so, the store computer 26, or more specifically, application 27 executed at store computer 27, may retrieve customer account information, which may include vehicle repair histories, payment information, or other customer account information. As described herein, the vehicle service is associated with a customer account so that vehicle service information may be exchanged via the customer account.

At block 406, customer and/or vehicle data is received and processed by the vehicle maintenance application server 20. Customer data may include customer account information, payment data, authentication data, and so on, and may be provided by the kiosk 12, mobile computing device 15, data repository 22, or a combination thereof. Vehicle data may include a vehicle identifier, vehicle history information, requested services, and so on, and may be provided by the kiosk 12, mobile computing device 15, data repository 22, or a combination thereof.

At block 408, the customer data and vehicle data are updated with status information and stored at the data repository 22. Status examples may include "waiting for service", "service in progress", "pending customer response", "ready for pickup," or other information maintained at the vehicle maintenance application server 20 and/or data repository 22.

Status information may include a current status of the vehicle, updated customer data such as a change in address, new credit card, and so on. Other status information may include data not provided by the TLE maintenance application 27 such as updated customer data. This type of information may be received from the mobile computing device 15 or the kiosk 12 and be processed and stored by vehicle maintenance application server 20 and data repository 22, respectively.

At block 410, a customer barcode is generated. The barcode may be generated that associates the vehicle 13 with the customer 11. The barcode is the unique identification that is generated for a customer's visit and is used as the unique key, or record locator, to the user's information stored in the data repository 22.

At block 412, the barcode is printed along with service details, such as a type of service, price, disclaimers and warranty information, and so on. The printed output may be provided to the customer 11, for example, by the store associate 25.

At block 414, the barcode may be attached to the vehicle key so that the barcode remains with the vehicle key during the service, for example, by a store associate 25, and permit a barcode reader or the like to be used to quickly identify the customer 11 or rightful owner of the vehicle 13.

At block 416, the vehicle service is performed, for example, by a mechanic or other associate.

At block 418, the vehicle maintenance application server 20 may receive status change information from the associate 26 via the vehicle maintenance application 27 executed at a computing device 20. A status change may include a change that requires customer acknowledge or approval such as a change in the original agreed upon price. The change information may be output (block 420) as a notification to the customer's mobile device 15. At block 422, the customer may provide a response where warranted, for example, a yes indicating an acceptance of additional work per the change status, or a no response indicating no acceptance. At block 424, the vehicle service is completed. The associate 25 may from a mobile computer 26 enter a status, i.e., service completed, at a user interface. The mobile computer 26 in response may communicate with the kiosk 12 and send an indicator to the mobile computer 26 that the kiosk 12 is ready to receive the vehicle key. The kiosk 12 may include a door, opening, or the like for receiving the vehicle key.

At block 426, the kiosk 12 may include an optical scanner or the like for scanning a barcode from the vehicle key and receiving the key at its slot 306 for retrieval by the customer 11. As described above, the key barcode is scanned at this time because the barcode is the unique identification that is used to retrieve a customer's record from the data repository 22, which is processed for the current customer visit. At block 428, the vehicle maintenance application server 20 receives from the kiosk 12 the slot data to attach to the barcode and/or order. For example, slot data may include the identifier for the kiosk slot, or bin, that contains the customer's keys so that the kiosk 12 knows from which slot to retrieve the vehicle keys.

At block 430, the slot data is stored at the data repository 22 with other customer and/or vehicle information, such as the data described herein. At block 432, the kiosk 12 generates and outputs a notification to the customer 11 regarding the vehicle status, i.e., the completion of the service. Other information may be provided in the notification such as slot location in the kiosk 12 where the vehicle key may be located, payment instructions, and so on. The notification may also contain a service report including information such as but not limited to service performed, inspection results, recommended future service, and so on. At block 434, the notification is received by the customer's mobile computing device 15.

At block 436, the customer 11 may at the kiosk 12 scan the barcode of the label, tag, or the like that matches the barcode scanned at block 426. A fingerprint or other biometric source may be scanned to establish the identity of the authorized customer 11. At block 438, the customer may provide a payment, for example, using a credit card or the like that processed at the kiosk card reader 304. At block 440, the payment may be authorized, for example, by the kiosk 12 sending the payment data to the vehicle maintenance application server 20, which in turn outputs the payment data to a service provider for authorization. In other embodiments, the kiosk 12 outputs the payment data directly to the service provider.

At block 442, the authorization result and/or other settlement data regarding the payment may be stored at the data repository 22 for future retrieval, for example, for subsequent customer visits where a vehicle service history may be obtained.

At block 444, the kiosk 12 dispenses the key from the assigned slot. At block 446, a receipt may be printed by a printer 23. An electronic receipt may also or alternatively be generated, for example, output to the customer's mobile electronic device 15 and/or other computer.

As will be appreciated by one skilled in the art, concepts may be embodied as a device, system, method, or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Computer program code for carrying out operations for the concepts may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Concepts are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While concepts have been shown and described with reference to specific preferred embodiments, it should be understood by those skilled in the art that various changes in form and detail may be made therein without departing from the spirit and scope as defined by the following claims.

What is claimed is:

1. A system, comprising:
    a data repository that stores vehicle service information related to a vehicle for receiving the vehicle service, customer account information a person associated with the vehicle, payment information regarding the payment of the vehicle service, or a combination thereof;
    a payment kiosk that displays information related to the payment of the vehicle service, processes the payment of the vehicle service, and includes a dispenser integral with the payment kiosk that dispenses a key of the vehicle after the payment is processed; and
    a maintenance application processor that facilitates a communication between a mobile device of the person associated with the vehicle, a mobile device of a representative of the facility performing the vehicle service, the data repository, and the payment kiosk.

2. The system of claim 1, wherein the maintenance application processor provides status information regarding the vehicle service to the mobile device of the person associated with the vehicle.

3. The system of claim 1, wherein the payment kiosk comprises:
    a display for displaying the information related to the payment of the vehicle service; and
    a special purpose processor that processes the payment of the vehicle service.

4. The system of claim 2, wherein the special processor receives data from a mobile electronic device indicating that the vehicle service is completed, and wherein the status information is generated in response to the received data.

5. The system of claim 1, wherein the payment kiosk includes a plurality of repositories, each constructed and arranged to temporarily store a corresponding plurality of keys.

6. The system of claim 5, wherein the payment kiosk distinguishes the key from the other keys of the plurality of keys by barcode data retrieved from a barcode corresponding to the key.

7. The system of claim 1, wherein the payment kiosk confirms a completed transaction that includes a completion of the vehicle service and authorization of the payment of the vehicle service prior to the dispenser of the payment kiosk dispensing the key of the vehicle.

8. The system of claim 1, wherein the payment kiosk includes a biometric device that associates the customer with the vehicle by receiving and registering authentication information with a barcode associating the vehicle with the customer, and wherein the dispenser dispenses the key in response to a process that includes associating the vehicle with the customer.

9. The system of claim 2, wherein the status information includes a status change, and wherein the dispenser dispenses the key of the vehicle in response to the status change.

* * * * *